US012747019B2

(12) United States Patent
Straś et al.

(10) Patent No.: US 12,747,019 B2
(45) Date of Patent: Sep. 29, 2026

(54) WHEEL AND BRAKE ASSEMBLY

(71) Applicant: GOODRICH CORPORATION, Charlotte, NC (US)

(72) Inventors: Karol Straś, Jelenia Góra (PL); Adam Wyszowski, Wrocław (PL); William P. May, Tipp City, OH (US); Orly Leiva Lam, Dayton, OH (US); Michael Shu, Pittsburgh, PA (US); Jacob Allen Dickel, New Vienna, OH (US); Dominik Kosiba, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 567 days.

(21) Appl. No.: 18/187,130

(22) Filed: Mar. 21, 2023

(65) Prior Publication Data

US 2023/0303240 A1 Sep. 28, 2023

(30) Foreign Application Priority Data

Mar. 28, 2022 (EP) .................................... 22461530

(51) Int. Cl.

| | |
|---|---|
| ***B64C 25/44*** | (2006.01) |
| ***F16D 65/84*** | (2006.01) |
| *F16D 65/78* | (2006.01) |

(52) U.S. Cl.

CPC ............. *B64C 25/44* (2013.01); *F16D 65/84* (2013.01); *F16D 2065/781* (2013.01); *F16D 2065/785* (2013.01)

(58) Field of Classification Search

CPC .... F16D 2065/785; F16D 65/84; F16D 55/36; F16D 2055/007; F16D 2069/006;

(Continued)

(56) References Cited

U.S. PATENT DOCUMENTS 2,407,197 A * 9/1946 Watts .................... F16D 65/128 188/264 CC
3,575,270 A * 4/1971 Wagenfuhrer ........ F16D 65/125 192/30 R (Continued)

FOREIGN PATENT DOCUMENTS

| | | |
|---|---|---|
| DE | 102018121330 | 3/2020 |
| EP | 0499192 | 8/1992 |

(Continued)

OTHER PUBLICATIONS

European Patent Office, European Search Report dated Sep. 13, 2022 in Application No. 2461530.2.

*Primary Examiner* — Robert A. Siconolfi
*Assistant Examiner* — Mahbubur Rashid
(74) *Attorney, Agent, or Firm* — SNELL & WILMER L.L.P.

(57) ABSTRACT

A wheel and brake assembly comprising: a stator; a rotating assembly mounted around and rotatable relative to the stator about an axis A; a torque tube in fixed engagement with the stator; a stack of brake disks mounted about the torque tube, the stack of brake disks comprising alternate rotor disks and stator disks, the stator disks attached to the torque tube and the rotor disks attached to the rotating assembly; a brake actuator configured to, in response to a brake command, apply a pressing force on the stack of brake disks to cause frictional engagement between the rotor disks and the stator disks such that the stator disks prevent the rotor disks and, hence the rotating assembly, from rotating relative to the torque tube.

20 Claims, 3 Drawing Sheets

(58) Field of Classification Search

CPC .... F16D 65/128; F16D 65/78; F16D 65/0972; F16D 2065/1328; F16D 65/853; F16D 13/72; F16D 2065/1332; F16D 2065/783; F16D 2125/14; F16D 51/08; F16D 2065/789; F16D 2065/781; B64C 25/44

See application file for complete search history.

(56) References Cited

U.S. PATENT DOCUMENTS

| | | | | |
|---|---|---|---|---|
| 3,651,895 | A | 3/1972 | Whitfield | |
| 5,507,370 | A | 4/1996 | White et al. | |
| 2005/0183909 | A1 | 8/2005 | Rau, III et al. | |
| 2005/0217950 | A1 | 10/2005 | Jolley, Jr. et al. | |
| 2013/0015697 | A1 * | 1/2013 | Hall | B64C 25/36 188/264 G |
| 2014/0124318 | A1 * | 5/2014 | Frait | B21J 5/00 29/428 |
| 2017/0321770 | A1 * | 11/2017 | Cyrot | F16D 65/62 |
| 2020/0292017 | A1 * | 9/2020 | French | F16D 65/0006 |
| 2021/0310528 | A1 * | 10/2021 | Deng | B64C 25/44 |

FOREIGN PATENT DOCUMENTS

| | | | | | |
|---|---|---|---|---|---|
| GB | 1251039 | A | * | 10/1971 | F16D 65/125 |
| KR | 950025366 | | | 9/1995 | |
| WO | WO-9402753 | A1 | * | 2/1994 | F16F 15/12 |

* cited by examiner

WHEEL AND BRAKE ASSEMBLY

CROSS-REFERENCE TO RELATED APPLICATIONS

This application claims priority to, and the benefit of, EP Patent Application No. 22461530.2, filed Mar. 28, 2022 and titled "WHEEL AND BRAKE ASSEMBLY," which is incorporated by reference herein in its entirety for all purposes.

FIELD

The present disclosure is concerned with wheel and brake assemblies especially, but not exclusively, for vehicles e.g. aircraft.

BACKGROUND

Wheel and brake assemblies, e.g. in aircraft, typically comprise a number of relatively rotating parts and parts that come into frictional engagement during braking which results in generation of heat at certain locations within the system. The locations where heat is generated, and to which heat is transferred, will suffer wear and possibly failure due to the heat. This results in certain parts of the assembly needing to be replaced while other parts of the assembly are still in good working condition. The life of the overall assembly, though, is usually dictated by the life of the first parts to fail or to be worn to a predetermined degree, after which the entire assembly usually needs to be replaced.

There is, therefore, a need to enable better heat distribution across the parts of the assembly.

SUMMARY

According to this disclosure, there is provided a wheel and brake assembly comprising: a stator; a rotating assembly mounted around and rotatable relative to the stator about an axis A; a torque tube in fixed engagement with the stator; a stack of brake disks mounted about the torque tube, the stack of brake disks comprising alternate rotor disks and stator disks, the stator disks attached to the torque tube and the rotor disks attached to the rotating assembly; a brake actuator configured to, in response to a brake command, apply a pressing force on the stack of brake disks to cause frictional engagement between the rotor disks and the stator disks such that the stator disks limit rotation of the rotor disks and, hence the rotating assembly, relative to the torque tube; wherein the stator disks are attached to the torque tube by means of a plurality of splines around the torque tube and a plurality of recesses in the stator disks in which the splines engage; wherein the rotor disks are attached to the rotating assembly by means of a plurality of torque bars extending radially inwards from the rotor and a plurality of recesses in the rotor disks with which the torque bars engage; and wherein at least one or more of the plurality of torque bars or one or more of the plurality of splines has a cavity formed therein and wherein liquid sodium is provided in the cavity.

The cavity may be provided in one or more of the splines and/or one or more of the torque bars.

The assembly may also have a heat shield between the stator and the rotating assembly and the sodium may be incorporated into the heat shield.

The assembly may be an aircraft wheel and brake assembly where the stator is part of the landing gear and the rotating assembly is the wheel assembly.

BRIEF DESCRIPTION OF THE DRAWINGS

Examples of an assembly according to the disclosure will now be described by way of example only with reference to the drawings. It should be noted that variations are possible within the scope of the claims.

DETAILED DESCRIPTION

Figure 1A:
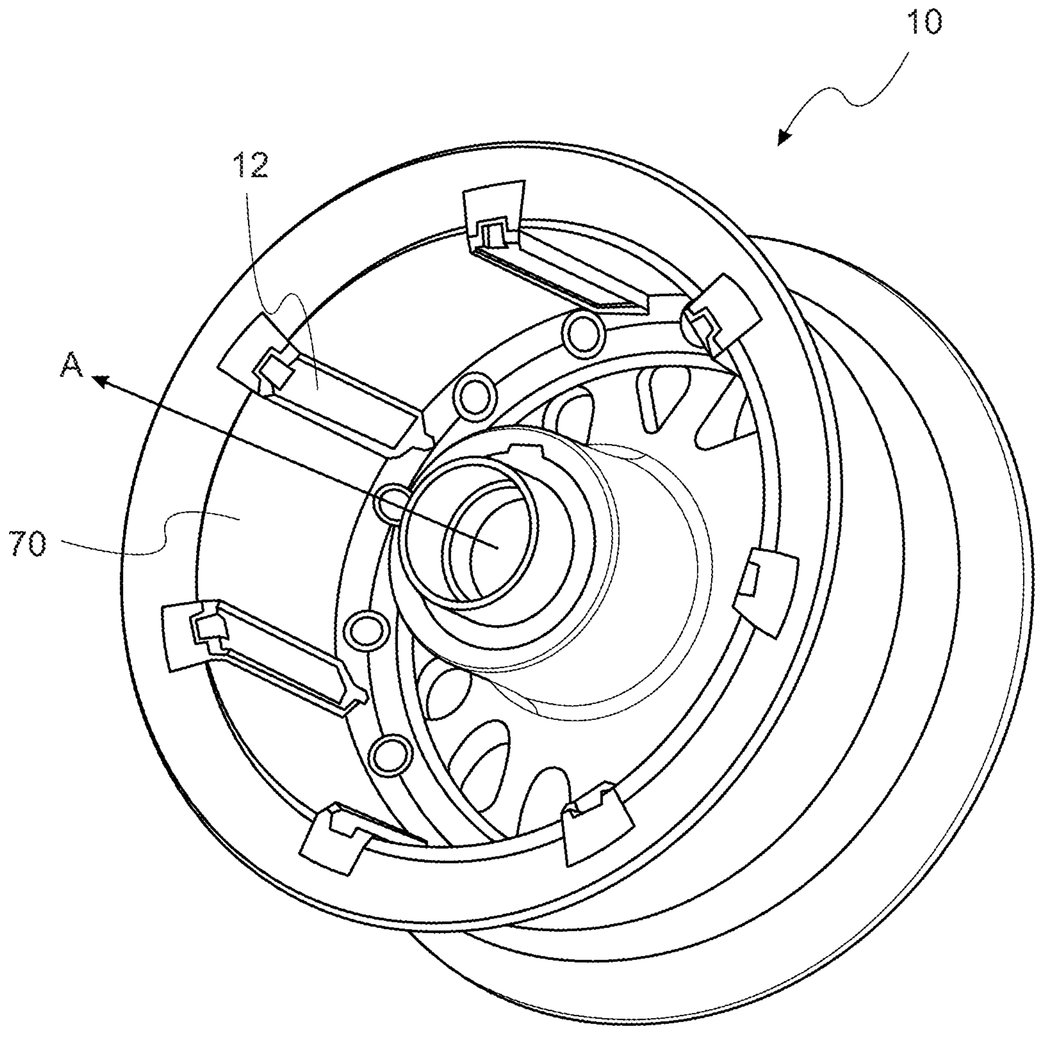
FIG. 1A shows a wheel assembly to which the teaching of the present disclosure may be applied.
Figure 1B:
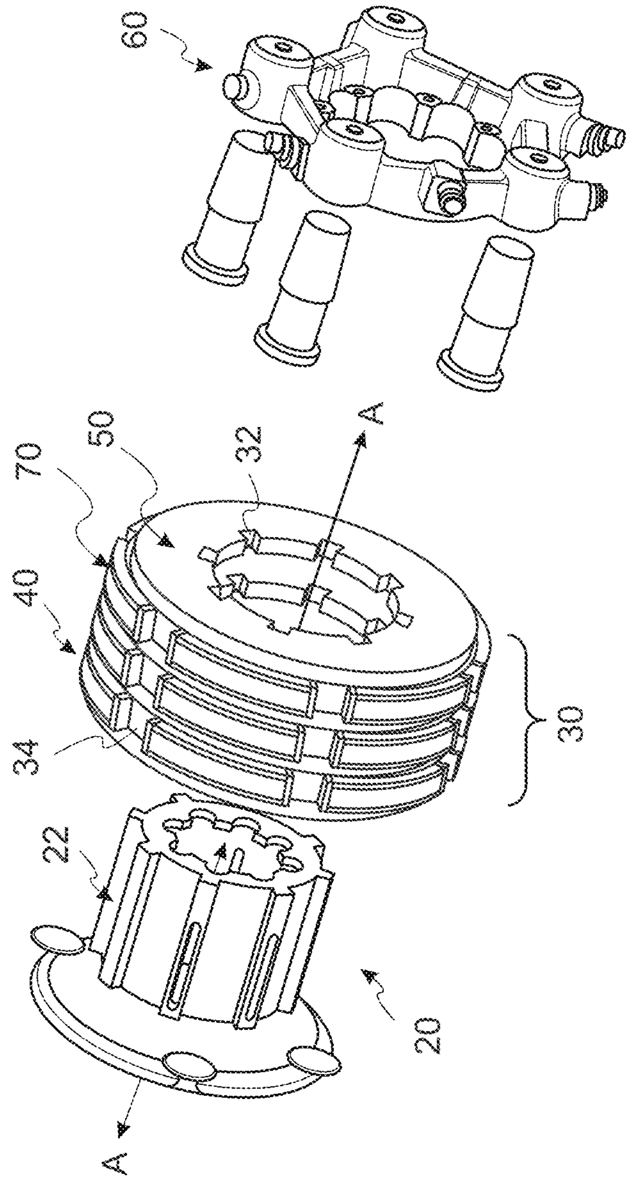
FIG. 1B shows a brake assembly to which the teaching of the disclosure may be applied.

A typical wheel and brake assembly will first be described, by way of background, and with reference to FIGS. 1A and 1B. It should be noted that this is just one example of a wheel and brake assembly to which the teachings of the disclosure may be applied.

A wheel and brake assembly typical includes a stator, or stationary (non-rotating) part and a rotating assembly, which rotates relative to the stator. In an aircraft wheel and brake assembly, for example, the rotating assembly may include the wheel 10 and the stator may be a fixed axle, such as the landing gear axle. A torque tube 20 is provided in fixed engagement with the stator. The brake assembly comprises a number of brake plates or disks, together forming a heat sink 30, arranged along the axis of the torque tube. The brake disks form a brake stack of alternate rotor disks 40 and stator disks 50. The stator disks are fixed to the torque tube 20 (and, hence, the stator) by means of splines 22 provided on the torque tube that engage in recesses 32 formed around the inner perimeter of the stator disks. The rotor disks engage with torque bars 12 provided around the inner surface of the wheel, where the torque bars 12 work as splines that engage with recesses 34 provided around the outer perimeter of the rotor disks.

To cause braking of the wheel—i.e. to decelerate rotation or stop rotation of the wheel—a brake actuator 60 causes the stack of brake disks to be pressed together in the axial direction. The compression of the disks means that each rotor disk 40 is tightly held between two adjacent stator disks 50 and the frictional force prevents the rotor disks, and hence the wheel 10 to which they are connected via the torque bars 12, from rotating.

Often, wheel and brake assemblies are provided with a heat shield 70 around the interior of the wheel. The main purpose of the heat shield is to offer resistance to radiation and convection heat transfer to the wheel.

Even with the presence of a heat shield, however, there are certain locations within the wheel assembly where a greater amount of heat will be transferred and these can result in hotspots where there is a greater degree of wear and/or risk of damage to the parts. Such hotspots can arise, for example, at or around the locations of spline engagement between the brake disks and the torque bar/drive inserts.

According to the present disclosure, heat distribution within the assembly is improved using metallic sodium provided in cavities formed at pertinent locations within the assembly as will be described further below.

The use of metallic sodium is known in other applications, particularly in the automotive field. For example, metallic sodium is often incorporated into valve parts in car engines. Metallic sodium is highly conductive compared to materials commonly used for valve components, and in its liquid phase, sodium has a thermal conductivity similar to aluminium. Sodium phase-changes to liquid at a temperature of around 212 deg. F. (100 deg C.). In one example, a valve interior may be filled up to around 60% of its volume with liquid metallic sodium. The head of the valve will usually be relatively hot creating a high temperature gradient. When the body of the valve contains the sodium, the temperature is equalized across the valve part and heat transfer between the engine parts is increased. The valve is in constant motion and there is, therefore, constant heat exchange between the hot and the cold part of the valve, improving the overall heat distribution along the entire valve part.

In the present disclosure, the properties of metallic sodium are used to advantage in wheel and brake assemblies to improve heat distribution in the assembly. Wheel and brake parts such as the torque tube are often made of materials such as titanium (e.g. Ti 6-4) that have a lower thermal conductivity. The downside of such materials is that they provide relatively poor heat exchange between the assembly parts. The high thermal conductivity of liquid sodium has been found by the inventors to increase heat exchange between parts of the wheel and brake assembly when incorporated into wheel and brake assembly parts that are formed of other, less thermally conductive materials.

Figure 2:
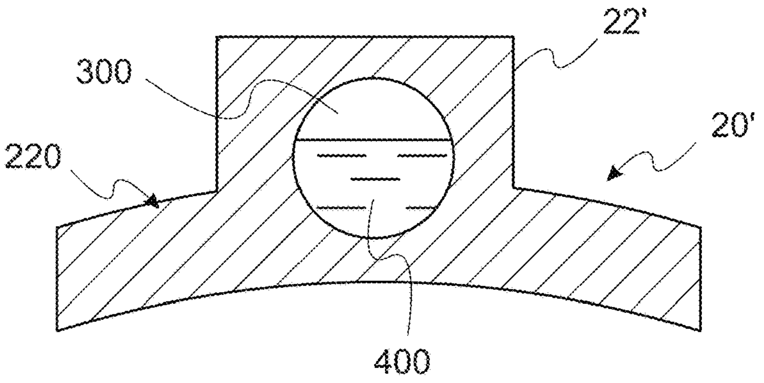
FIGS. 2, 3, and 4 are cross sectional views of a torque tube spline, a torque bar, and a heat shield, respectively, to which the teaching of the disclosure may be applied.

In one example, liquid sodium could be incorporated into the spline of the torque tube as shown, for example, in FIG. 2. In this example, the torque tube 20' is provided with splines 22' extending radially outwards from its outer periphery 220. FIG. 2 shows only a part of the torque tube 20' with one spline 22', but the torque tube 20' would actually be provided with several splines distributed around its periphery. As mentioned above, and as is conventional, the splines engage with recesses 32 formed around the circumference of the stator disks in the brake stack to fix the stator disks against rotation relative to the torque tube.

Generally, the torque tube, being a stationary part, will only experience vibrations, but these will give sufficient torque tube displacements to distribute liquid metallic sodium inside the cavity 300.

In this example, the temperature can be equalized by forming a cavity 300 in the spline 22' extending along the length of the torque tube 20'. Metallic sodium 400 is provided in the cavity. At temperatures around or above 100 deg. C., the sodium will change to liquid and, as mentioned above, the relatively high thermal conduction properties of the liquid sodium will result in greater heat exchange between the assembly parts and improved heat distribution.

Providing the sodium in the torque tube splines 22' is just one example of how and where metallic sodium can be advantageously used in a wheel and brake assembly.

Figure 3:
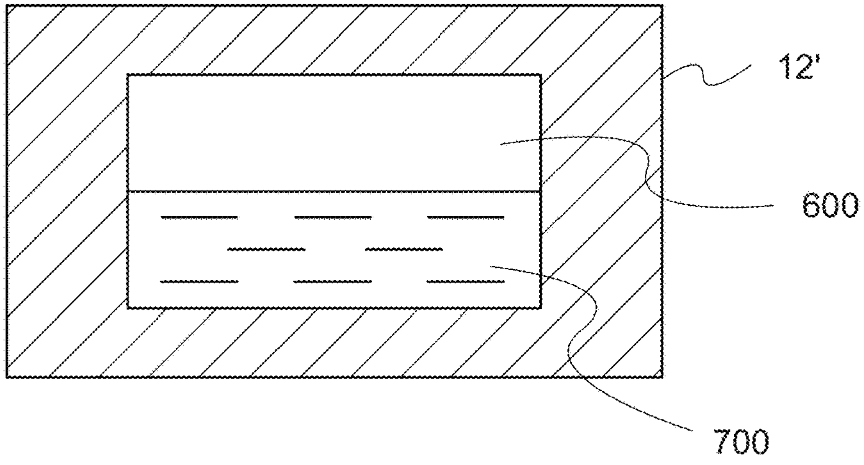

Another example is shown in FIG. 3. Here, the sodium is incorporated in one or more of the torque bars that provide engagement between the rotating assembly (wheel) and the rotor disks. FIG. 3 is a cross-section of one torque bar 12', which is substantially rectangular (although other shapes are also possible). A cavity 600 is provided along the interior length of the drive bar. The cavity may have substantially the same cross-sectional shape as the drive bar or could have a different (e.g. circular) cross-sectional shape. Metallic sodium 700 is provided in the cavity.

It is envisaged that only the torque tube splines are modified to include metallic sodium, or only the drive bars, or both. It could also be envisaged that only some of the splines and/or some of the drive bars are modified to incorporate metallic sodium.

Figure 4:
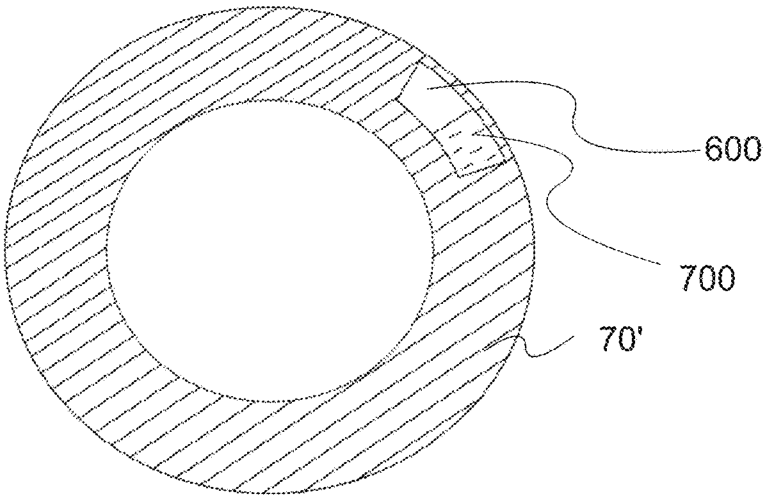

In another example, as shown in FIG. 4, metallic sodium could be incorporated into the heat shield 70'. Heat shields 70' can take various forms and are provided between the heat sink and the wheel to protect the wheel from radiation and convection heat flow. For example, heat shields 70' are often formed by arcuate panels provided within the wheel. According to the disclosure, metallic sodium 600 could, for example, be incorporated in the heat shield 70'. According to the disclosure, metallic sodium 600 could, for example, be provided within a cavity 700 in the heat shield 70'. It will be understood that FIGS. 2, 3, and 4 are representative illustrations not necessarily drawn to scale.

By incorporating metallic sodium into parts of the wheel and brake assembly, the temperature of the assembly could be reduced or at least equalized. If the temperature is more equally distributed, there is less stress on the components due to thermal expansion at certain locations.

What is claimed is:

1. A wheel and brake assembly comprising:
a stator;
a rotating assembly mounted around and rotatable relative to the stator about an axis A;
a torque tube in fixed engagement with the stator;
a stack of brake disks mounted about the torque tube, the stack of brake disks comprising alternate rotor disks and stator disks, the stator disks attached to the torque tube and the rotor disks attached to the rotating assembly;
a brake actuator configured to, in response to a brake command, apply a pressing force on the stack of brake disks to cause frictional engagement between the rotor disks and the stator disks such that the stator disks limit rotation of the rotor disks and, hence the rotating assembly, relative to the torque tube;
wherein the stator disks are attached to the torque tube by means of a plurality of splines around the torque tube and a plurality of recesses in the stator disks in which the splines engage;
wherein the rotor disks are attached to the rotating assembly by means of a plurality of torque bars extending radially inwards from the rotating assembly and a plurality of recesses in the rotor disks with which the torque bars engage; and
wherein each of the plurality of splines has a cavity formed therein and wherein liquid sodium is provided in the cavity.

2. The assembly of claim 1, further comprising a heat shield provided between the stator and the rotating assembly.

3. The assembly of claim 2, wherein metallic sodium is provided in a second cavity in the heat shield.

4. The assembly of claim 2, wherein the heat shield is in the form of a plurality of arcuate panels.

5. The assembly of claim 2, wherein the heat shield is in the form of a plurality of arcuate panels.

6. The assembly of claim 1, wherein each of the plurality of torque bars is provided with a third cavity in which metallic sodium is provided.

7. The assembly of claim 1, wherein one or some of the plurality of torque bars are not provided with a third cavity in which metallic sodium is provided.

8. The assembly of claim 1, in which one or some of the splines are not provided with the cavity.

9. The assembly of claim 1, wherein the metallic sodium changes to liquid at 100 deg. C.

10. The assembly of claim 1, wherein the cavity has a rectangular cross-section.

11. The assembly of claim 1, wherein the cavity is provided along the length of the torque bar/spline.

12. The assembly of claim 1, wherein the rotating assembly is a wheel assembly.

13. The assembly of claim 1, being a wheel and brake assembly of an aircraft.

14. The assembly of claim 13, wherein the rotating assembly is an aircraft wheel assembly and the stator is a part of a landing gear of the aircraft.

15. A wheel and brake assembly comprising:

a stator;

a rotating assembly mounted around and rotatable relative to the stator about an axis A;

a heat shield provided between the stator and the rotating assembly, wherein metallic sodium is provided in a first cavity in the heat shield;

a torque tube in fixed engagement with the stator;

a stack of brake disks mounted about the torque tube, the stack of brake disks comprising alternate rotor disks and stator disks, the stator disks attached to the torque tube and the rotor disks attached to the rotating assembly;

a brake actuator configured to, in response to a brake command, apply a pressing force on the stack of brake disks to cause frictional engagement between the rotor disks and the stator disks such that the stator disks limit rotation of the rotor disks and, hence the rotating assembly, relative to the torque tube;

wherein the stator disks are attached to the torque tube by means of a plurality of splines around the torque tube and a plurality of recesses in the stator disks in which the splines engage;

wherein the rotor disks are attached to the rotating assembly by means of a plurality of torque bars extending radially inwards from the rotating assembly and a plurality of recesses in the rotor disks with which the torque bars engage;

wherein at least one or more of the plurality of torque bars or one or more of the plurality of splines has a second cavity formed therein and wherein liquid sodium is provided in the second cavity.

16. The assembly of claim 15, wherein each of the plurality of torque bars is provided with the second cavity in which metallic sodium is provided.

17. The assembly of claim 15, wherein one or some of the plurality of torque bars are not provided with the second cavity.

18. The assembly of claim 15, wherein each of the plurality of splines is provided with the second cavity in which metallic sodium is provided.

19. The assembly of claim 15, in which one or some of the splines are not provided with the second cavity.

20. The assembly of claim 15, wherein the metallic sodium changes to liquid at 100 deg. C.

* * * * *